Patented Jan. 2, 1940

2,185,178

UNITED STATES PATENT OFFICE 2,185,178

DUSTING POWDER

Reinhard Beutner, Philadelphia, Pa., assignor to Parke, Davis & Company, Detroit, Mich., a corporation of Michigan No Drawing. Application October 30, 1937, Serial No. 172,041. In Germany August 21, 1933

7 Claims. (Cl. 167—58)

The present invention relates to dusting powders, and more particularly to dusting powders having synthetic resins incorporated therein.

It is an object of the present invention to provide a dusting powder composed of or containing a synthetic resin in the powdered condition, which is capable of imparting novel and desirable properties to the composition.

The present invention is a continuation-in-part of my copending application Serial No. 710,529, filed February 9, 1934, which issued as Patent No. 2,097,439 on November 2, 1937.

In carrying out the process of the present invention, I first produce a phenol-resin of the fusible, soluble type, from which water of reaction and of solution, and preferably also unreacted phenol and formaldehyde, have been expelled, yielding a resin which is solid at room temperature and is non-hygroscopic. The resins are produced in any known manner, for example, as disclosed in my above mentioned application, or by any known method for the production of novolaks; it is, however, not essential that the resin be of the permanently fusible type.

As described in the application above referred to, the condensation is carried out by reacting approximately equi-molecular proportions of phenol and formaldehyde in the presence of a catalyst until an alcohol-soluble resin is obtained which is solid at room temperature. The water and uncombined phenol and formaldehyde are then driven off in known manner, with or without the aid of vacuum, the product, as is known, being a solid brittle resin. It is recommended that the last traces of phenol be removed as far as possible as this compound would tend to make the product hygroscopic and cause it to lump in the powdered condition.

This powdered resin is preferably mixed with other powdered materials, such as are commonly employed in dusting powders, such as talc, zinc oxide, zinc stearate, and other powders which tend to prevent adhesion.

The phenol formaldehyde resin, as described in my above mentioned application, possesses analgesic, vaso-constrictive, and also disinfecting properties, and thus greatly enhances the value of the dusting powder. The therapeutic action of the powder can be still further increased by incorporating various medicaments in the resin, in particular those suitable for the treatment of the skin, prior to mixing with the talc, zinc oxide, or other powdered addition. The medicaments may be solid, such as salicyclic acid, or liquid, such as coal tar. The use of a phenolic resin is of particular advantage in dusting powders because I have found that it permits the incorporation of liquid or sticky medicaments, such as coal tar and the like, in a dusting powder, the dryness and keeping qualities of the powder being apparently unaffected by the liquid character of the addition. Thus, to incorporate a liquid or adhesive medicament in a dusting powder, I may first melt the solid phenolaldehyde resin and add the tar thereto, the mixture being then heated in an open container, for example, over an open flame, with vigorous stirring, until a drawn sample proves on cooling to be entirely non-adhesive. This resinous composition can now be powdered and yields an entirely dry non-hygroscopic powder. The solid resin thus acts as a vehicle for the liquid medicament which it would be difficult, if not impossible, to incorporate into a dry dusting powder. If desired, inert resins like shellac or ester gum (glycerol abietate) may be mixed with the molten phenol formaldehyde resin; the addition of such resins being sometimes desirable as they increase the fluidity of the molten mass.

Especially when a liquid medicament is to be incorporated in the dusting powder is the property of fusibility of my resin of striking advantage and importance; for where the condensation has been so conducted that an infusible resin is obtained, or one that becomes infusible immediately on heating, it is impossible to mix a liquid material therewith and obtain a uniform, dry composition.

I desire it to be understood that phenolic resins of various kinds can be employed for the manufacture of my improved dusting powder; the phenol may be either ordinary phenol or any of the homologues of phenols or mixtures of such homologues with ordinary phenol; the aldehyde may be of various kinds, but is preferably formaldehyde, and may be replaced in whole or in part by ketones such as acetone.

The following example illustrates a satisfactory method of carrying out the invention:

Example 50 parts of a fusible, soluble, resinous condensate of a phenol and carbonyl-containing compound, preferably phenol and formaldehyde, obtained in any known manner, for example, by the condensation of approximately equi-molecular proportions of the phenol and carbonyl-containing compound or compounds, at approximately the boiling point, under reflux, in the presence of any suitable catalyst, until an alcohol-soluble resin which is solid and brittle at room temperature, is obtained, are mixed with 10 parts of crude coal tar. The mixture is heated over an open flame under constant stirring until a drawn sample is brittle and non-adhesive on cooling. The temperature employed may range from 100–200° C., or even higher, but care should be taken to avoid carbonization of the resin. The mass is then allowed to cool and is pulverized very finely. An equal amount of high grade talc, also finely powdered, is now thoroughly mixed with the powdered resin. This mixture can be employed directly as a dusting powder.

The use of the talc is desirable as it overcomes any tendency of the resinous powder to lump. The talc should be mixed in the dry condition with the powdered resin-medicament mixture. In place of the talc, there can be employed also zinc oxide and zinc stearate, as already mentioned, and also starch, lycopodium, stearic acid, etc.

If desired, the powdered phenolic resin, freed from uncombined phenol and formaldehyde, can be used alone. This fine powder, as will be evident from what has been said above, is in the fusible condition and will not reach the insoluble, infusible state on heating. It thus differs from phenol formaldehyde molding powders, which are of the heat-hardenable type and contain accelerators, such as hexamethylenetetramine, such compositions rapidly turning into an infusible mass on heating.

In addition to the medicaments above mentioned, various other medicinal agents suitable for application to the skin may be incorporated in the phenolic resin. The proportions of resin to medicament and of resin to dusting powder addition, i. e., lumping-preventing agent, may vary within wide limits, and it is to be understood that I am not restricted to the proportions hereinabove indicated, the scope of the invention being that represented by the appended claims.

I claim:

1. The method of producing a dusting powder having analgesic and vaso-constrictive properties, comprising condensing a phenol and a member of the group consisting of aldehydes and ketones in such proportions that a permanently fusible condensate is obtained, heating the product to remove volatile matter including uncombined phenolic material, and pulverizing the solid resin so obtained to a fine powder.

2. The method of producing a dusting powder having analgesic and vaso-constrictive properties, comprising condensing phenol and formaldehyde under such conditions that a fusible condensate is obtained, mixing coal tar with the resin in the liquid state in the proportion of approximately 10 parts of the former to 50 parts of the latter, heating the mixture until it is brittle and non-adhesive at body temperature, and pulverizing the solid resinous mixture so obtained.

3. A dusting powder characterized by analgesic and vaso-constrictive properties and comprising the powdered solidified mixture of a fusible phenol-formaldehyde resin and coal tar.

4. A dusting powder characterized by analgesic and vaso-constrictive properties and comprising a powdered solidified mixture of a fusible phenol-aldehyde resin and a medicament suitable for the treatment of the skin.

5. The method of producing a dusting powder having analgesic and vaso-constrictive properties, comprising condensing phenol and formaldehyde under such conditions that a fusible condensate is obtained which is solid at room temperature, adding a medicinal agent, suitable for the treatment of the skin, to the resin in the liquid state, heating the mixture until it is brittle and non-adhesive at body temperature, and pulverizing the solid resinous mixture so obtained.

6. A dusting powder possessing the analgesic and vaso-constrictive properties of a partially condensed phenol-formaldehyde resin but substantially free from the irritating action of free phenol and formaldehyde, and comprising a finely powdered fusible phenol-formaldehyde resin from which uncombined phenol and formaldehyde have been expelled, said resin being capable of being heated without being converted into the final, infusible state.

7. A dusting powder comprising a powdered, heat-solidified mixture of approximately 50 parts of a fusible phenol-formaldehyde resin and about 10 parts of coal tar incorporated in the resin in the liquid condition of the latter, mixed with approximately 60 parts of talc.

REINHARD BEUTNER.